ELECTROMECHANICAL WAVE FILTER HAVING RESONANT BARS COUPLED TO EACH OTHER BY TORSION WIRES WHICH ALSO SUPPORT BARS

Filed Feb. 17, 1961

United States Patent Office 3,142,027
Patented July 21, 1964

3,142,027
ELECTROMECHANICAL WAVE FILTER HAVING RESONANT BARS COUPLED TO EACH OTHER BY TORSION WIRES WHICH ALSO SUPPORT BARS

Hans Albsmeier and Werner Poschenrieder, Munich, Germany, assignors to Siemens & Halske Aktiengesellschaft Berlin and Munich, a corporation of Germany
Filed Feb. 17, 1961, Ser. No. 90,141
Claims priority, application Germany Feb. 26, 1960
9 Claims. (Cl. 333—72)

This invention is concerned with a filter for electric waves, employing mechanical resonators, and with an electrostrictive coupling arrangement for such filter.

Filters employing mechanical resonators exhibit good electrical properties and therewith great steepness of flank at the borders of the pass range and of the blocking range. Previously known filters utilizing mechanical resonators operate in most instances with torsion oscillators or longitudinal oscillators. Torsion oscillators are primarily suitable for frequencies of 100 kilocycles and higher. Longitudinal oscillators made for lower frequencies, for example, below 50 kilocycles, become geometrically very large. Attempts have been made to construct for such low frequencies mechanical filters by using tuning forks, but such filters also have relatively large dimensions. In order to avoid these drawbacks, the coupling devices of such filters are usually constructed based upon magnetostriction, that is, they require an exciting coil, a permanent magnet and, in some situations, an accurately adjusted air gap.

An electromechanical filter has become known in which a plurality of bending oscillators which are disposed side by side, are connected over coupling rods provided in the node of the bending oscillations, and having instead of the electromagnetic or magnetostrictive coupling, a bimorph cell disposed respectively at the input and at the output. A bimorph cell comprises two plates of electrostrictive (piezoelectric) material, such plates enclosing a thin metal insert and forming a compact unit therewith. The outer surfaces of the cell are metallized. Alternating voltages placed on the metallized material, in opposite phase with respect to the metal insert, causing the cell to bend to one or the other side. As disturbing features may be mentioned, first, the complicated structure of the coupling between the resonators and, second, relatively unsatisfactory quality of the resonators at the input and at the output of the filter. The latter is obviously due to the use of the bimorph cells.

The object of the invention is to provide filters employing mechanical resonators which are, especially in the region of very low frequencies of small geometric dimensions, and which avoid the above indicated difficulties.

According to the invention, this object is realized, in connection with a filter device for electric waves, utilizing mechanical resonators constructed as bending oscillators which are by means of coupling members interconnected to form a mechanically rigid unit, such coupling members being disposed in the range of the oscillation node and transmitting torsion forces, and being small as compared with a quarter wavelength, by rigidly fastening upon the individual bending oscillators a wire which is common thereto, such wire forming the coupling members and preferably also serving as a holder for the filter.

According to a further development along the thoughts underlying the present invention, the bending oscillators and/or the coupling members are made of metal, especially of a steel alloy with a low temperature coefficient. A plurality of such wires can be provided to serve as coupling members. The triggering of the terminal resonators could be effected with the use of bimorph cells.

However, it has been found advantageous to fasten upon the resonator, preferably within the region of an oscillation bulge, a strip or a plate of electrostrictive material and to provide the surface thereof which faces away from the resonator, with a triggering electrode which supplements the electrostrictive material to a piezoelectric coupling system adapted to execute transverse contraction motions in the direction of the resonator axis.

The various objects and features of the invention will appear from the description of embodiments which is rendered below with reference to the accompanying drawing.

FIG. 1 indicates a bending condition of an oscillator, as seen in side elevation;

Figures 1, 2, 3, 4, 5, 6:
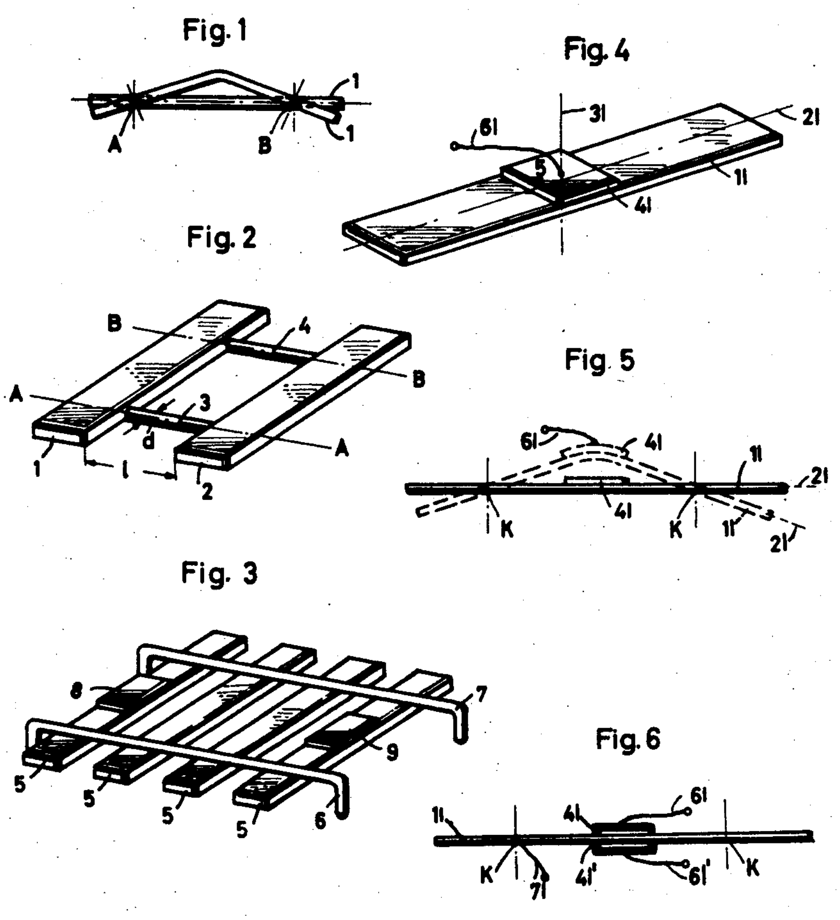
FIG. 2 is a perspective view of two bending oscillators with a known construction of the coupling.
FIG. 3 is a view similar to FIG. 2, illustrating an electromechanical filter made according to the teachings of the present invention.
FIG. 4 is a perspective view of a bending oscillator illustrating means for the coupling and decoupling of the filter.
FIG. 5 is a side elevational view of the oscillator shown in FIG. 4, illustrating the bending action in dotted lines.
FIG. 6 is a side elevational view illustrating the use of electrostrictive material on both sides of a bending oscillator.

The bending oscillators 1 and 2 shown in FIG. 2 are made of steel alloy exhibiting thermal expansion which is as slight as possible and provided with a known intercoupling. The oscillation condition indicated in FIG. 1 is assumed to obtain in connection with these bending oscillators, FIG. 1 merely indicating the deflection to one side. The bending oscillators 1 and 2 are connected over coupling members 3 and 4 to form a rigid unit. The coupling members 3 and 4 are circular rods, preferably of metal, which are inserted into the bending oscillators and soldered thereto or merely soldered or spot-welded thereto. Owing to the arrangement of the coupling members 3 and 4 within the range of the oscillation nodes A and B, only torsion forces are transmitted between the bending oscillators 1 and 2. The shorter the length 1 of the coupling members 3 and 4, the firmer will be the coupling of successively disposed resonators. The diameter $d$ of the coupling rods is in addition to the properties of the material thereof important for the coupling.

As contrasted with the above noted structure, FIG. 3 shows an electromechanical filter made according to the teachings of the present invention, comprising four bending oscillators 5 upon which are rigidly fastened, within the range of the oscillation nodes A, B (FIG. 1), wire brackets 6 and 7. Upon each of the two outer resonators and within the oscillation bulge thereof is fastened a plate of electrostrictive material, preferably an electrostrictive ceramic material such as barium titanate, preferably soldered thereto, which is upon the side facing away from the resonator provided with a metal coating, forming terminals 8 and 9. Owing to the transverse contraction of the individual oscillators in longitudinal direction, this electrostrictive coupling system excites the bending oscillator employed as the input, and the bending oscillator employed as the output gives off mechanical energy in analogous manner to the corresponding coupling member, electric output voltage being thereby available between the terminal 9 and the metal mass of the resonator. The wire brackets 6, 7, which also serve as holders for the entire filter system, are for this purpose angularly shaped at the ends thereof. The angularly extending ends are, for example, suitably fastened upon a mounting plate or in a suitable protective housing (not shown).

Further details as to the coupling and decoupling of the filter are apparent from FIGS. 4, 5 and 6. The corresponding coupling and decoupling means may also be applied in connection with known filters operating witb bending oscillators, such as shown in FIG. 2.

FIG. 4 shows as an example a mechanical bending oscillator 11 which is made of steel alloy with low temperature coefficient. The longitudinal axis 21 of the oscillator is indicated by a dot-dash line. In the region of the oscillation bulge indicated by dash line 31, there is provided a plate 41 made of electrostrictive ceramic material, preferably barium titanate, such plate being soldered to the bending oscillator 11. This ceramic plate 41 is on its free side provided with a metal coating 51, such coating serving as an exciting or triggering electrode. This metal coating, preferably a gold coating, can be vaporized or burnt-in on the plate 41 in known manner. A highly elastic, extremely thin terminal wire 61 is connected to the metal coating 51, for example, by soldering, such wire accordingly having a small mass. Another terminal wire 71 (FIG. 6) is conductively fastened to the metallic bending oscillator 11 in the oscillation node thereof.

Upon connecting to the terminal wires 61, 71 an alternating voltage with a frequency lying in the range of resonance of the bending oscillator 11, such oscillator will execute bending oscillations as schematically indicated in FIG. 5, showing in dash lines a deflection only to one side. The electrostrictive ceramic plate 41 is thus subjected to expansion and contraction in the direction of the axis 21, by the so-called transverse contraction, since the principal expansion is effected in the direction of the electric field which extends perpendicular to the oscillator axis. The quality ofthe condenser formed by the ceramic member is very high and the mass thereof is small as compared with that of the resonator and, accordingly, the quality of the entire oscillator is very high. It is moreover of advantage in connection with the illustrated embodiment, to fasten the electrostrictive ceramic member at an area in which the maximum tensile stress of the surface structure of the bending oscillator appears upon oscillation thereof, thereby achieving a relatively high electromechanical coupling factor.

As shown in FIG. 6, electrostrictive material may be provided on both sides of the bending oscillator. It is in such case necessary to supply the condensers, formed by the electrostrictive material 41, 41' in cooperation with the exciting electrodes 61, 61' and 71, with alternating voltage in opposite phase, or to polarize such condensers oppositely.

Figure 7:
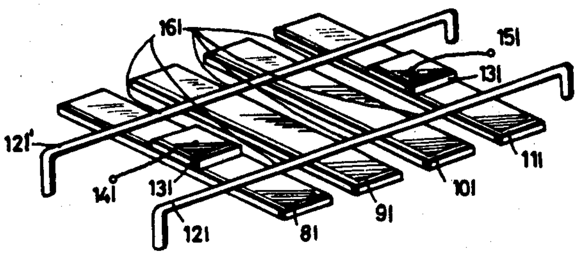
FIG. 7 is a perspective view of a filter similar to the one shown in FIG. 3 and provided with the coupling arrangement according to the invention.

FIG. 7 represents an electromechanical filter similar to the one shown in FIG. 3, provided with the coupling arrangement according to the present invention. The filter comprises, for example, four resonators or bending oscillators 81, 91, 101, 111, which are made of steel alloy with a temperature coefficient as low as possible, these oscillators or resonators being by means of bridging members 121, 121', rigidly interconnected to form a unit, such bridges effecting the coupling of successive resonators. Electrostrictive material 131, is, as explained before, disposed upon the terminal resonators, such material being provided with exciting electrodes to which are fastened terminals as indicated at 141 and 151, thus forming with the terminal resonators electrostrictive coupling arrangements. The mounting of the filter is suitably effected in the oscillation nodes, that is, in the case of an oscillation according to FIG. 5, at the points indicated at K. The holding wires are secured in place by soldering or spot welding, such wires supporting the entire system and being anchored, for example, in a housing (not shown) which encloses the filter and secures it against damage and contamination. The electrical input is formed, for example, by the terminal lead-in 141 and the metal mass of the resonator 81, which is electrically conductively accessible over 161, 171. The output of the filter is formed by the terminal lead 151 and the metal mass of the resonator 111.

Changes may be made within the scope and spirit of the appended claims which define what is believed to be new and desired to have protected by Letters Patent.

We claim:

1. A filter for electric waves, comprising a plurality of mechanical resonators made in the form of bending oscillators, coupling members arranged between said resonators in the range of the oscillation nodes thereof and interconnecting said resonators to form a self-sustaining unit, the material of said coupling members being small as compared with one quarter wave length and being effective to transmit torsional forces, said coupling members each being formed by a wire element which is common to said resonators, said element lying upon and being rigidly connected with each of said resonators, and having their free ends, at least at one end of the filter, extending therefrom to form non-loading supporting means therefor.

2. A filter according to claim 1, wherein the respective resonators are made of a steel alloy with low temperature coefficient.

3. A filter according to claim 1, wherein said coupling members are made of a steel alloy with a low temperature coefficient.

4. A filter according to claim 1, wherein said coupling members and said resonators are made of a steel alloy with low temperature coefficient.

5. A filter according to claim 1, comprising a plurality of said wires as and for the purpose specified.

6. A filter according to claim 1, wherein said resonators are disposed side by side, the resonators at the opposite ends being provided with coupling elements operating as electrostrictive members.

7. A filter according to claim 1, wherein said resonators are disposed side by side, the resonators at the opposite ends being respectively provided at least on one side thereof with an element made of electrostrictive material which is disposed thereon in the region of the oscillation bulge, the free surface of the respective elements being provided with an exciting electrode which supplements the electrostrictive material to a piezoelectric coupling system which executes transverse contraction motions in the direction of the axis of the respective resonators.

8. A filter according to claim 7, wherein an element made of electrostrictive material is disposed on both sides of the respective resonator.

9. A filter according to claim 7, wherein said electrostrictive material is an electrostrictive ceramic material, comprising barium titanate.

References Cited in the file of this patent

UNITED STATES PATENTS

| | | |
|---|---|---|
| 2,652,542 | Anthony | Sept. 15, 1953 |
| 2,695,357 | Donley | Nov. 23, 1954 |
| 2,769,867 | Crownover | Nov. 6, 1956 |
| 2,799,832 | Niederman | July 16, 1957 |
| 2,814,785 | Burns | Nov. 26, 1957 |
| 2,859,416 | Niederman | Nov. 4, 1958 |
| 2,999,989 | Niederman | Sept. 12, 1961 |
| 3,015,789 | Honda | Jan. 2, 1963 |